United States Patent
Tsou et al.

(10) Patent No.: US 10,781,278 B2
(45) Date of Patent: Sep. 22, 2020

(54) COMB-BLOCK COPOLYMERS OF ISOBUTYLENE COPOLYMER BACKBONE WITH FUNCTIONAL POLYMER COMB ARMS

(71) Applicant: ExxonMobil Chemical Patents Inc., Baytown, TX (US)

(72) Inventors: Andy H. Tsou, Houston, TX (US); David S. Cushing, Houston, TX (US); Jason A. Mann, Houston, TX (US); Abhimanyu O. Patil, Westfield, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 99 days.

(21) Appl. No.: 15/761,910

(22) PCT Filed: Aug. 17, 2016

(86) PCT No.: PCT/US2016/047374
§ 371 (c)(1),
(2) Date: Mar. 21, 2018

(87) PCT Pub. No.: WO2017/058379
PCT Pub. Date: Apr. 6, 2017

(65) Prior Publication Data
US 2018/0291133 A1     Oct. 11, 2018

Related U.S. Application Data

(60) Provisional application No. 62/235,138, filed on Sep. 30, 2015.

(51) Int. Cl.
| | | |
|---|---|---|
| *C08F 293/00* | (2006.01) | |
| *C08L 53/00* | (2006.01) | |
| *C09K 3/10* | (2006.01) | |
| *C08F 291/04* | (2006.01) | |
| *B60C 1/00* | (2006.01) | |
| *C08L 53/02* | (2006.01) | |

(52) U.S. Cl.
CPC ............ *C08F 293/005* (2013.01); *B60C 1/00* (2013.01); *B60C 1/0008* (2013.01); *B60C 1/0016* (2013.01); *C08F 291/04* (2013.01); *C08L 53/005* (2013.01); *C08L 53/025* (2013.01); *C09K 3/1009* (2013.01); *C08F 2438/01* (2013.01)

(58) Field of Classification Search
CPC .... C08F 293/05; C08L 53/025; B60C 1/0008; B60C 1/0016
See application file for complete search history.

(56) References Cited

U.S. PATENT DOCUMENTS

| | | |
|---|---|---|
| 5,162,445 A | 11/1992 | Powers et al. |
| 5,548,029 A | 8/1996 | Powers et al. |
| 5,741,864 A | 4/1998 | Patil |
| 5,824,717 A | 10/1998 | Merrill et al. |
| 6,103,832 A | 8/2000 | Patil |
| 6,326,433 B1 | 12/2001 | Wang et al. |
| 6,548,585 B1 | 4/2003 | Ozawa et al. |
| 7,923,491 B2 | 4/2011 | Weng et al. |
| 8,110,026 B2 | 2/2012 | Prud'Homme et al. |
| 2005/0031816 A1 | 2/2005 | Chang et al. |
| 2006/0194053 A1 | 8/2006 | Fink et al. |
| 2006/0229404 A1 | 10/2006 | Lechtenboehmer |
| 2010/0036023 A1 | 2/2010 | Weng et al. |
| 2010/0036038 A1 | 2/2010 | Rodgers et al. |
| 2010/0096595 A1 | 4/2010 | Prud'Homme et al. |
| 2011/0124819 A1 | 5/2011 | Hoelzl et al. |
| 2012/0208013 A1* | 8/2012 | Clapper ............... C08G 81/021 428/355 AC |

FOREIGN PATENT DOCUMENTS

| | | |
|---|---|---|
| EP | 2 461 154 A | 6/2012 |
| WO | 92/11295 A | 7/1992 |
| WO | 2008/042025 A | 4/2008 |
| WO | 2008/075010 A | 6/2008 |

(Continued)

OTHER PUBLICATIONS

Fonagy et al., "Polyisobutylene-graft-polystyrene by quasiliving atom transfer radical polymerization of sytrene from poly(isobutylene-co-p-methylstyrene-co-p-bromomethylstyrene)", Macromol. Rapid Commun., vol. 19, pp. 479-483 (1998).

Gusev et al., "Rational Design of Nanocomposites for Barrier Applications", Advanced Materials, vol. 13, No. 12, pp. 1641-1643, 2001.

Gyor et al., "Comb-like Triblock Copolymers by Wurtz-Grignard Coupling of Syndiotactic PMMA Anions to poly[p-bromemethyl)styrene]-b-polyisobutylene-b-poly[p-bromemethyl)styrene]" Polymer Bulletin, vol. 32, No. 2, (1994), pp. 155-162.

(Continued)

Primary Examiner — Edward J Cain

(57) ABSTRACT

Comb-block copolymers of isobutylene copolymer backbone with functional comb arms, methods for making a comb-block copolymer comprising polymerizing one or more monomer components comprising units derived from at least one of acrylates, vinyl terminated $C_6$ to $C_{20}$ aromatics, acrylamides, and acrylonitrile using a halogenated copolymer initiator having a benzylic-halide moiety via atom transfer radical polymerization (ATRP) in the presence of a transition metal complex catalyst at a temperature ranging from 30° C. to 150° C., the use of these comb-block copolymers as a tire tread additive, as a nanofiller dispersant in elastomeric nanocomposite compositions comprising halobutyl rubber, as a surfactant, as a sealant, and as an additive in a latex formulation is disclosed.

24 Claims, 1 Drawing Sheet

(56) References Cited

FOREIGN PATENT DOCUMENTS

WO    2010/016976 A    2/2010
WO    2011/149603 A    12/2011

OTHER PUBLICATIONS

Hong et al., "Preparation of Polyisobutene-graft-Polystyrene with Different Compositions and Side Chain Architectures through Atom Transfer Radical Polymerization (ATRP)", Macromol. Chem. Phys. 2001, vol. 202, pp. 3392-3402.
Patil, "A Novel Reactive Functionalization of Polyolefin Elastomers: Direct Functionalization of Poly(isobutylene-co-p-methylstyrene) by a Friedel-Crafts Acylation Reaction", ACS Symposium Series, American Chemical Society, pp. 184-198 (1998).
Truelsen et al., "Synthesis by ATRP of triblock copolymers with densely grafted styrenic end blocks from a polyisobutylene macroinitiatior", Macromol. Rapid Commun., vol. 21, (2000), pp. 98-102.

* cited by examiner

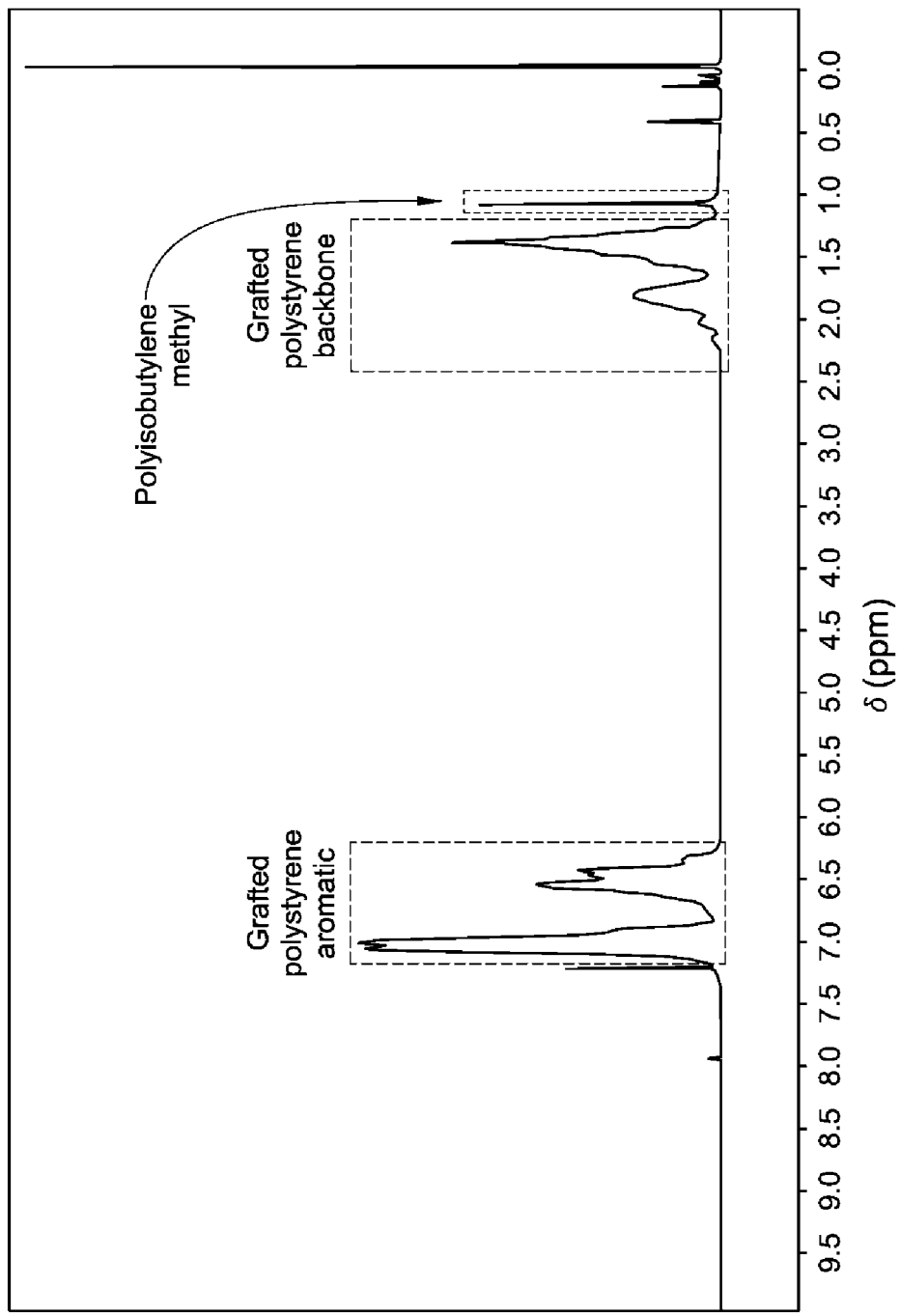

COMB-BLOCK COPOLYMERS OF ISOBUTYLENE COPOLYMER BACKBONE WITH FUNCTIONAL POLYMER COMB ARMS

PRIORITY CLAIM

This application is a National Phase Application claiming priority to PCT Application Serial No. PCT/US2016/047374 filed Aug. 17, 2016, which claims priority to U.S. Provisional Application No. 62/235,138 filed Sep. 30, 2015 the disclosure of which is incorporated herein by reference.

CROSS-REFERENCE TO RELATED APPLICATION

This application is related to concurrently filed U.S. Provisional Application No. 62/235,116 filed Sep. 30, 2015 entitled "POLYCYCLIC AROMATIC HYDROCARBON FUNCTIONALIZED ISOBUTYLENE COPOLYMERS FOR DISPERSING GRAPHENE AND GRAPHITE," the disclosure of which is incorporated herein by reference.

FIELD OF THE INVENTION

The present invention relates to comb-block copolymers having an isobutylene copolymer backbone with functional polymer (e.g., polyacrylate, polystyrene, polyacrylamide, and/or polyacrylonitrile) comb arms produced via atom transfer radical polymerization (ATRP), and the use of these copolymers as a tire tread additive, as a nanofiller dispersant in elastomeric nanocomposite compositions comprising halobutyl rubber, a surfactant, a sealant, and as an additive in a latex formulation.

BACKGROUND OF THE INVENTION

Halobutyl rubbers, which are halogenated isobutylene/isoprene copolymers, are the polymers of choice for best air retention in tires for passenger, truck, bus, and aircraft vehicles. Bromobutyl rubber, chlorobutyl rubber, and halogenated star-branched butyl rubbers can be formulated for specific tire applications, such as tubes or innerliners. In addition, these elastomers are preferred barrier layers for pharmaceutical stoppers and are useful as engine mounts for damping purposes. Examples of these elastomers are bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene) copolymer or BIMSM), etc.

However, the "inertness" of saturated hydrocarbon polymers such as BIMSM, their low reactivity and incompatibility with most other materials, and the difficulties in adhering them to, or using them in conjunction with most other materials, has restricted their use in many areas. For instance, halobutyl rubbers are incompatible with general purpose rubbers, such as SBR (styrene-butadiene rubber), NR (natural rubber), and BR (cis butadiene rubber); incompatible with acrylics (including polyacrylates and polymethacrylates); and incompatible with graphene, graphite, carbon blacks, and silica due to their inherent hydrophobicity where their isobutylene contents are greater than 95 mol %. These incompatibilities prevent their uses in BR/SBR tire tread compounds (for better damping and tractions), in acrylic latex coating (for better impermeability and less moisture sensitivity), and in nanocomposites (for lower permeability and better mechanical properties).

Because of these deficiencies, chemical modification of the elastomers, modification of the blend component, and the use of additional compatibilizing blend components, has been attempted. U.S. Pat. No. 5,162,445 discloses a method to improve polymer blend compatibility or blend co-curability by copolymerizing an unsaturated comonomer and/or a comonomer having reactive functionality with isobutylene. U.S. Pat. No. 5,548,029 discloses graft copolymers of isobutylene-p-methylstyrene copolymers to compatibilize blends of saturated and unsaturated elastomers.

US 2006/0229404 discloses a method for making compositions of an elastomer with exfoliated graphite in which the diene monomers are polymerized in the presence of 10 phr or more exfoliated graphite so that the graphite is intercalated with the elastomer.

U.S. Pat. No. 6,548,585 discloses refrigerant hoses made with an inner tube composition of a brominated copolymer rubber such as BIMSM with an inorganic lamellar compound, such as graphite, zirconium phosphate, calcogenides, talc, kaolinite, benotnite, montmorillonite, mica, chlorite, etc.

There is still a continuing need, however, for improving the compatibility of halobutyl rubbers with general purpose rubbers, acrylics, and fillers such as graphite, graphene, carbon black, and silica. The present invention fulfills this need by providing novel comb-block copolymers having a halobutyl rubber backbone and functional polymer comb arms. The functional polymer comb arms improve the compatibility of these comb-block copolymers with other materials (e.g., general purpose rubbers, acrylics, and fillers) over that of conventional halobutyl rubbers.

SUMMARY OF THE INVENTION

This invention relates to a comb-block copolymer and a method for producing the same. The comb-block copolymer has a polymeric backbone comprising at least one halogenated copolymer having units derived from isoolefins having from 4 to 7 carbons and a para-alkylstyrene, and one or more polymeric comb arms comprising at least one functional polymer. The functional polymer comprises at least one aromatic moiety and/or at least one heteroatom containing moiety. Preferably, the functional polymer is capable of being formed by ATRP, and preferably comprises at least one monomer component having units derived from at least one of acrylates, styrenes, acrylamides, and acrylonitrile.

The method for making the comb-block copolymer comprises polymerizing one or more monomer components having units derived from at least one of acrylates, styrenes, acrylamides, and acrylonitrile using a halogenated copolymer initiator having a benzylic-halide moiety via atom transfer radical polymerization (ATRP). The halogenated copolymer initiator comprises units derived from isoolefins having from 4 to 7 carbons and a para-alkylstyrene. The polymerization is performed in the presence of a transition metal complex catalyst.

The invention further relates to an elastomeric nanocomposite composition comprising a comb-block copolymer. The comb-block copolymer has a polymeric backbone comprising at least one halogenated copolymer having units derived from isoolefins having from 4 to 7 carbons and a para-alkylstyrene, and one or more polymeric comb arms comprising at least one monomer component having units derived a vinyl terminated $C_6$ to $C_{20}$ aromatic. The nanocomposite composition further comprises at least one elastomer component comprising units derived from isoolefins having from 4 to 7 carbons, preferably wherein the elastomer component comprises units derived from at least one multiolefin, and at least one nanofiller.

BRIEF DESCRIPTION OF THE DRAWING

FIG. 1 depicts the $^1$H-NMR spectra of a comb-block copolymer comprising a halogenated copolymer backbone with polystyrene comb arms produced via atom transfer radical polymerization of styrene from brominated poly (isobutylene-co-p-methylstyrene).

DETAILED DESCRIPTION OF THE INVENTION

This invention(s) describes comb-block copolymers having a halogenated isobutylene copolymer backbone with functional polymer (e.g., polyacrylate, polystyrene, polyacrylamide, and/or polyacrylonitrile) comb arms produced via atom transfer radical polymerization (ATRP). The comb-block copolymers formed of this invention are suitable for use as a tire tread additive due to their compatibility with general purpose rubbers (such as styrene-butadiene rubber (SBR)), as a nanofiller dispersant in halobutyl based elastomeric nanocomposite compositions, as a surfactant, as a sealant, and as an additive in a latex formulation to impart hydrophobicity and impermeability to coatings.

Definitions

As used herein, "polymer" may be used to refer to homopolymers, copolymers, interpolymers, terpolymers, etc. Likewise, a copolymer may refer to a polymer comprising at least two monomers, optionally with other monomers.

The term "comb-block copolymer" refers to a copolymer having an identifiable backbone polymer chain containing two or more branching points from which comb arm polymer chains grow. The comb arm polymer chains are chemically distinct from the backbone polymer chain.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition.

As used herein, "isobutylene based elastomer" or "isobutylene based polymer" or "isobutylene based rubber" refers to elastomers or polymers comprising at least 70 mole percent isobutylene.

As used herein, "isoolefin" refers to any olefin monomer having at least one olefinic carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "controlled radical polymerization" means that in the polymerization process chain breaking reactions are insignificant compared to chain propagation reactions, and the resulting polymers were produced with molecular weight control, narrow molecular weight distribution, end-group control and the ability to further chain extend.

As used herein, "nanocomposite" or "nanocomposite composition" refers to polymer systems containing inorganic particles with at least one dimension in the nanometer range within a polymer matrix.

As used herein, "solvent" refers to any substance capable of dissolving another substance. When the term solvent is used it may refer to at least one solvent or two or more solvents unless specified. The solvent may be polar or non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

The comb-block copolymers of this invention preferably consist essentially of the product of an ATRP process from starting materials comprising a halogenated copolymer, which forms the comb-block copolymer backbone, and one or more monomer components comprising units derived from acrylates, styrenes, acrylamides, and/or acrylonitriles, which form the comb arms of the comb-block copolymer. It has been discovered that the benzylic-halide moiety of the halogenated copolymer functions as a suitable ATRP initiator, thereby enabling the formation of the inventive copolymers.

Atom Transfer Radical Polymerization

Recent developments in polymer chemistry offer the synthetic chemist a wide range of tools to prepare well-defined, highly functional building blocks. Controlled/"Living" Radical Polymerization (CRP) has been shown to be suitable for the preparation of organic/inorganic hybrid materials with varying structural complexity.

Controlled radical polymerization (CRP) has proved to be a versatile and robust method to prepare well-defined organic polymers. In the past decade, several techniques have been developed to synthesize well-defined polymers via radical polymerization. A major difference between conventional radical [i.e., azobis(isobutyronitrile)- or peroxide-initiated processes] and CRP is the lifetime of the propagating radical during the course of the reaction. In conventional radical processes, radicals generated by decomposition of the initiator undergo propagation and bimolecular termination reactions within a second. In contrast, the lifetime of a growing radical can be extended to several hours in a CRP, enabling the preparation of polymers with predefined molar masses, low molecular weight distribution, controlled compositions, and functionality.

The mechanism invoked in CRP processes to extend the lifetime of growing radicals utilizes a dynamic equilibration between dormant and active sites with rapid exchange between the two states. Unlike conventional radical processes, CRP requires the use of persistent radical (deactivator) species, or highly active transfer agents to react with propagating radicals. These persistent radicals/transfer agents react with radicals (deactivation or transfer reactions) to form the dormant species. Conversely, propagating radicals are generated from the dormant species by an activation reaction.

In the past two decades, the field of CRP has seen tremendous development as evidenced by the wide range of materials that have been prepared using these techniques. In particular, three methods of considerable importance are as following: stable free-radical polymerization [SFRP; e.g., nitroxide-mediated processes (NMP)], metal-catalyzed atom transfer radical polymerization (ATRP), and degenerative transfer polymerization [e.g., reversible addition-fragmentation chain transfer (RAFT) polymerization].

The main advantage of "living" radical polymerization over prior living polymerization is that one can polymerize a broad range of monomers, including those that comprise polar moieties. Moreover, unlike living anionic polymerization, which requires very stringent conditions—practically zero moisture, zero air, and no impurities—these radical reactions can be carried out using less stringent conditions.

Atom-transfer radical polymerization (ATRP) is one of the several techniques for controlled/"living" radical polymerizations that yields well defined (co)polymers with precisely controlled architecture and functionality. The ATRP can be used to polymerize several monomers under conditions that are much less rigorous than previously required for ionic living polymerizations. ATRP is among the most efficient and robust of the CRP processes.

ATRP controls free-radical polymerization by the reversible activation/deactivation of growing chains. A small amount of the chains remain active during the reaction, whereas the majority of the chains lay dormant awaiting reactivation. Thus, the concentration of free-radical species is kept low and, consequently, termination processes are suppressed. It is the suppression of the termination process, particularly combination reactions that help ATRP, and the other controlled radical polymerization methods, to achieve the controlled molecular weights and low polydispersities in the final products, i.e., a molecular weight distribution (Mw/Mn) less than 1.5, more preferably a molecular weight distribution of approximately 1.2. Equilibrium is most commonly maintained by the reversible cleavage of a carbon halogen bond of an alkyl halide or benzyl halide initiator mediated by the presence of a transition metal catalyst complex comprising a transition metal halide and a suitable ligand. The cleavage results in a higher oxidation state transition metal complex and a radical that can either undergo deactivation, propagation with monomer units, or irreversibly terminate (Scheme 1).

Halogenated Copolymer Backbone

In any embodiment, the halogenated copolymer which forms a backbone for the comb-block copolymers produced in accordance with this invention is a copolymer of an isoolefin having from 4 to 7 carbon atoms and a para-alkylstyrene having the formula:

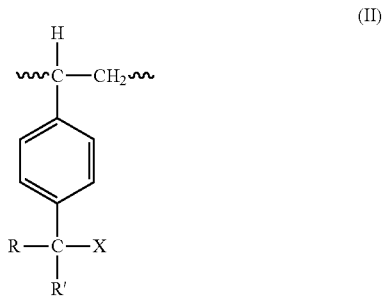

(II)

wherein X is a halogen and R and R' are independently selected from the group consisting of hydrogen, alkyl, and primary and secondary alkyl halides.

The cleavage of the C—X bond in the benzylic-halide moiety in these molecules can now be readily used to initiate ATRP of acrylates, styrenes, acrylamides, and/or acrylonitriles to produce the comb-block copolymers hereof comprising the halogenated copolymer as a backbone with comb arms of polyacrylate, polystyrene, polyacrylamide and/or polyacrylonitrile. The number of comb arms in the comb-block copolymer is dependent on the amount of the initiator. Therefore, the number of comb arms in the comb-block copolymer can be controlled through selection of the molar percentage of the benzylic-halide functionality in the halogenated copolymer. Preferably, the amount of benzylic-halide functionality ranges from 0.30 mol % to 1.30 mol %, more preferably from 0.45 mol % to 1.25 mol %, more preferably from 0.47 mol % to 1.20 mol %.

Most useful of such halogenated copolymer materials are elastomeric random interpolymers of isobutylene and alkylstyrene, preferably p-methylstyrene, containing from 0.5 to 20 mol % alkylstyrene, preferably p-methylstyrene, wherein up to 60 mol % of the methyl substituent groups present on the benzyl ring contain a bromine or chlorine atom, preferably a bromine atom (p-bromomethylstyrene). These interpolymers are termed "halogenated poly(isobutylene-co-p-methylstyrene)" or "brominated poly(isobutylene-co-p-methylstyrene)," and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which can include the isobutylene derived units, the p-methylstyrene derived units, and the p-halomethylstyrene derived units.

(I)

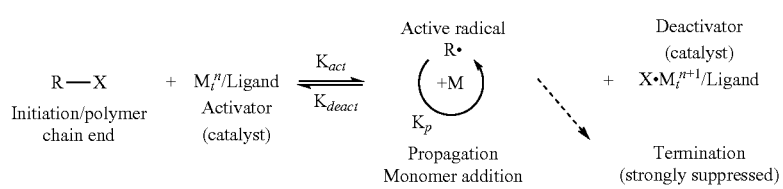

These halogenated copolymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution of less than 5, more preferably less than 3.5, more preferably less than 2.5; a preferred weight average molecular weight in the range of from 300,000 up to 750,000 g/mol; and a preferred number average molecular weight in the range of from 25,000 to 750,000 as determined by gel permeation chromatography. The Mooney Viscosity (1+8, 125° C., ASTM D1646, modified) is from 20 to 80 MU.

The halogenated copolymers can be prepared by a slurry polymerization of the monomer mixture using a Lewis acid catalyst, followed by halogenation, preferably bromination, in solution in the presence of halogen and a radical initiator such as heat and/or light and/or a chemical initiator.

Functional Monomers

Suitable monomers to form the functional comb arms of the inventive copolymers are those having substituents that can stabilize the propagating radicals during the ATRP process. Preferably, the monomer is ethylinically unsaturated, more preferably vinyl-terminated. For example, suitable monomers include vinyl substituted heterocycles, such as vinylpyridine and vinylpyrrolidone, and vinyl terminated $C_6$ to $C_{20}$ aromatics, but not linear alpha olefins or conjugated dienes. Preferably, the monomer comprises units derived from at least one of styrenes, acrylates, and derivatives of acrylates such as acrylamides and acrylonitrile. Suitable acrylates include, but are not limited to, methyl, ethyl, n-butyl, isobutyl, tert-butyl, 2-ethylhexyl, isobornyl, isodecyl, lauryl, myristyl, stearyl, behenyl acrylates, and the corresponding methacrylates. Suitable styrenes may be substituted at the phenyl group by one to three additional substituents selected from the group consisting of hydroxy, $C_1$-$C_4$-alkoxy, (e.g., methoxy or ethoxy), halogen, (e.g., chloro), and $C_1$-$C_4$-alkyl, (e.g., methyl or ethyl). Suitable acrylamides include, but are not limited to, acrylamide, N,N-dimethylacrylamide, 2-(N,N-dimethylaminoethyl)-acrylamide, 2-(N,N-dimethylaminopropylacrylamide, 2-aminoethylacrylamide, and the corresponding methacrylamides.

Catalyst

The catalyst employed during the ATRP process is typically a transition metal complex comprising a transition metal halide and a ligand. Suitable transition metals are those capable of undergoing a reversible redox reaction between a higher oxidation state and a lower oxidation state separated by one electron, preferably copper (Cu). Other suitable transition metals include titanium (Ti), molybdenum (Mo), rhenium (Re), iron (Fe), ruthenium (Ru), osmium (Os), rhodium (Rh), cobalt (Co), nickel (Ni), and palladium (Pd).

Suitable ligands are those capable of solubilizing the transition metal complex in the polymerization medium and providing a desired level of catalytic activity by affecting the redox potential of the complex. Preferably, the ligand is a nitrogen containing compound, including but not limited to, pentamethyldiethylenetriamine, tris[2-(dimethylamino)ethyl]amine, tris[(2-pyridyl)methyl]amine, the cyclams, and pyridines substituted at the 2 position with imines. More preferably, the ligand is 4,4-dinonyl-2,2'-dipyridyl (dNbpy). Ideally, the transition-metal complex comprises either Cu(I) Cl or Cu(I)Br as the transition-metal halide and dNbpy as the ligand.

The catalyst is preferably present at a concentration ranging from 10 to 10,000 ppm (with respect to the monomer). More preferably, the catalyst is present at a concentration ranging from 100 to 1,000 ppm.

Reducing Agent

A reducing agent is typically employed during the ATRP process in order to regenerate the transition metal catalyst. Alternatively, the transition metal catalyst may be regenerated via electrochemical means.

Suitable reducing agents are those capable of reducing the oxidation state of the transition metal when it is an oxidized state, but that do not form an active propagating species, an effective ATRP catalyst, or an effective ATRP initiator. Preferably, the reducing agent is selected from the group consisting of tin(II) 2-ethylhexanoate ($Sn(EH)_2$), ascorbic acid, methylaluminoxane (MAO), and cupric oxide (Cu(II) O). Most preferably, the reducing agent is $Sn(EH)_2$.

Polymerization Conditions

Depending upon the reactivity of the reagents used and the polymerization conditions, the ATRP process can be run at temperatures varying from about 0° C. to about 200° C. as limited by thermal stability of the monomer, the halogenated copolymer, catalyst, and the comb-block copolymer product. Normally, temperatures between about 0° and about 150° C. are preferred, most preferably from 30° C. to 150° C. Reaction times may range between several seconds and a few days.

A wide range of solvents and/or solvent blends may be used as the medium in which the polymerization is run. Solvents that are particularly suited for the polymerization medium, include, but are not limited to water, alcohols, acetonitrile, dimethylformamide (DMF), dichloromethane, and dimethyl sulfoxide (DMSO). In addition, aromatic solvents such as benzene, toluene, chlorobenzene, 1,2-dichlorobenze, and bulk styrene are generally good solvents for the halogenated copolymer backbone and monomers and provide a favorable polymerization medium for the ATRP process. In general, solvents having a higher Hildebrand solubility parameter containing some aromaticity or halogens (e.g., solubility parameter greater than 8.6 $cal^{1/2}$ $cm^{-3/2}$) are required for solution reactions with the tougher, higher Tg base polymers of this invention which contain higher paramethylstyrene contents.

Comb-Block Copolymer

The polymeric backbone of a comb-block copolymer produced in accordance with this invention(s) preferably has a weight average molecular weight (Mw) ranging from 300,000 to 750,000 g/mol, and a number average molecular weight (Mn) ranging from 100,000 to 350,000 g/mol. Each polymeric comb arm of the comb-block copolymer preferably has a weight average molecular weight (Mw) ranging from 2,000 to 625,000 g/mol, and a number average molecular weight ranging from 600 to 350,000 g/mol. The molecular weight distribution of the comb-block copolymer preferably ranges from 1.2 to 3.0, more preferably from 1.3 to 2.5.

Preferably, the comb-block copolymer has from 10 to 550 comb arms, more preferably from 15 to 500. As described above, the maximum number of comb arms in the comb-block copolymer is dependent on the amount of the benzylic-halide initiator in the halogenated copolymer backbone. For example, the maximum number of comb arms of a comb-block copolymer using EXXPRO™ 3035 (0.47 mol % benzylic bromine functionality) as the halogenated copolymer backbone is approximately 22, while the maximum number of comb arms using EXXPRO™ 3745 (1.2 mol % benzylic bromine functionality) is approximately 535. Steric and viscosity constraints can also limit the maximum number of comb arms.

Industrial Applications

The foregoing described comb-block copolymers can be used in a variety of industrial applications, e.g., as a tire tread additive, as a nanofiller dispersant in elastomeric nanocomposite compositions comprising halobutyl rubber, and as an additive in a latex formulation. The usefulness of the comb-block copolymers for specific types of industrial applications varies depending on the composition of the comb arms.

Comb-block copolymers comprising polystyrene comb arms can be used as a tire tread additive due to their compatibility with general purpose rubbers, such as styrene-butadiene rubber (SBR). Comb-block copolymers comprising comb arms formed from vinyl terminated $C_6$ to $C_{20}$ aromatic monomer components, preferably styrene, can be used as a nanofiller dispersant in HIIR (halobutyl) elastomeric nanocomposite compositions. Preferably, these copolymers can be used to form an elastomeric nanocomposite composition that further comprises at least one halogenated elastomer component comprising units derived from isoolefins having from 4 to 7 carbons, and one or more nanofillers. Preferably, the halogenated elastomer component also comprises units derived from at least one multiolefin. Ideally, the halogenated elastomer component is selected from the group consisting of chlorinated poly(isobutylene-co-isoprene) (CIIR) and brominated poly(isobutylene-co-isoprene) (BIIR). Preferred nanofillers include, but are not limited to, graphene, graphite, and carbon black.

The graphite is preferably in the form of nano graphene platelets (NGPs) obtained through rapid expansion of graphite. Expanded graphite can typically be made by immersing natural flake graphite in a bath of acid (such as sulphuric acid, nitric acid, acetic acid, and combinations thereof, or the combination of chromic acid, then concentrated sulfuric acid), which forces the crystal lattice planes apart, thus expanding the graphite.

Preferably, the graphite is or comprises graphene. Graphene is a one-atom-thick planar sheet of $sp^2$-bonded carbon atoms that are densely packed in a honeycomb crystal lattice. The carbon-carbon bond length in graphene is approximately 1.42 angstroms. Graphene is the basic structural element of graphitic materials including graphite, as graphite can be considered to be many layers of graphene. Graphene fragments can be prepared through chemical conversion of graphite. First, microcrystalline graphite is treated with a strongly acidic mixture of sulfuric acid and nitric acid. Then the material is oxidized and exfoliated resulting in small graphene plates with carboxyl groups at their edges. These are converted to acid chloride groups by treatment with thionyl chloride; next, they are converted to the corresponding graphene amide via treatment with octadecylamine. The resulting material (circular graphene layers of 5.3 angstrom thickness) is soluble in tetrahydrofuran, tetrachloromethane, and dichloroethane. (see Niyogi, et al. *Solution Properties of Graphite and Graphene, J. Am. Chem. Soc.*, 128(24), pp. 7720-7721 (2006).)

Preferably, the elastomeric nanocomposite composition comprises up to 99 wt % of the halogenated elastomer component, up to 45 wt % of the comb-block copolymer, up to 15 wt % of the nanofiller(s), and may also comprise additional fillers, thermoplastic resin, and/or processing oil and additives. Elastomeric nanocomposite compositions comprising a halogenated elastomer component, one or more nanofillers, and a nanofiller dispersant are described more in depth in U.S. Provisional Application No. 62/235,116 filed Sep. 30, 2015 entitled "Polycyclic Aromatic Hydrocarbon Functionalized Isobutylene Copolymers for Dispersing Graphite and Graphene", which is fully incorporated herein by reference in its entirety. Preferably, the elastomeric nanocomposite composition can be used in a tire innerliner.

Comb-block copolymers comprising polyacrylate comb arms can be used as a latex coating material and/or additive. Preferably, these copolymers can be water-borne and used as an additive in a latex formulation to impart hydrophobicity and impermeability to latex coatings. These comb-block copolymers can also be used as a silica dispersant tire tread additive. Where the acrylic monomer is n-butyl acrylate (nBA), the resulting comb-block copolymer can be used as a sealant. Where the acrylic monomer is t-butyl acrylate (tBA), the resulting comb-block copolymer can be converted to acrylic acid graft copolymers in accordance with Scheme 3:

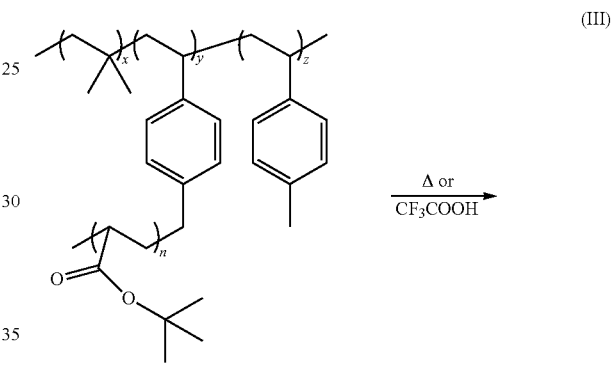

(III)

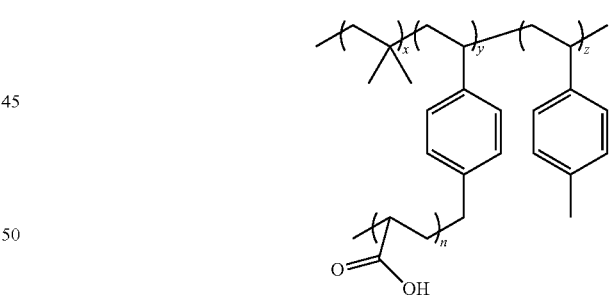

wherein x, y, z, and n each represent a polymeric unit that is repeated within the comb-block copolymer.

Such acrylic acid graft copolymers may not require vulcanization. Rather, these acid graft copolymers can be crosslinked by ionic association to obtain a thermoplastic elastomer.

Comb-block copolymers comprising poly(meth)acrylamide comb arms can be used as a surfactant due to their amphiphilic nature.

Comb-block copolymers comprising polyacrylonitrile comb arms can be used in under-the-hood applications as an oil resistant sealant in engines, gear boxes, and gaskets.

EXAMPLES

The foregoing discussion can be further described with reference to the following non-limiting examples.

Preparation of Backbone Copolymers A & B

Two grades of brominated poly(isobutylene-co-p-methylstyrene) obtained from ExxonMobil Chemical Company (Houston, Tex.) were used as the halogenated copolymer polymeric backbone for Examples 1-4. The first grade, EXXPRO™ 3035 (hereinafter "Backbone Copolymer A"), has 5 wt % p-methylstyrene units, 0.47 mol % benzylic bromine functionality, a molecular weight of 490,000, and Mooney Viscosity of 45±5. The second grade, EXXPRO™ 3745 (hereinafter "Backbone Copolymer B"), has 7.5 wt % p-methylstyrene units, 1.2 mol % benzylic bromine functionality, a molecular weight of 490,000, and Mooney Viscosity of 45±5.

To prepare Backbone Copolymers A & B for Examples 1-4, the calcium stearate ($CaSt_2$) used to stabilize the water slurry during the manufacturing process of these copolymers was first removed using column filtration.

Example 1

ATRP of n-Butyl Acrylate (nBA) from Backbone Copolymer A

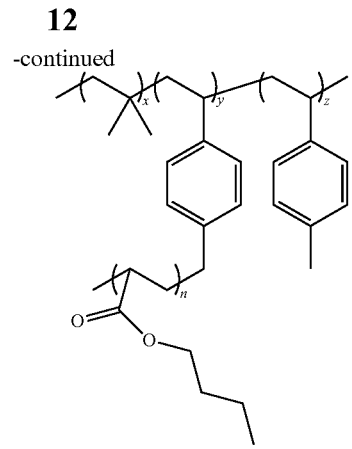

(IV)

wherein x, y, z, and n each represent a polymeric unit that is repeated within the comb-block copolymer.

CuCl (Aldrich, 99.99%) (7.8 mg, 78.9 µmol) and 4,4'-dinonyl-2,2'-dipyridyl (dNbpy, Aldrich, 97%) (67.3 mg, 159.8 µmol) were added in a 100 mL round bottom reaction flask with side arm. The reaction flask was then sealed with a glass stopper and purged with $N_2$ for about 1 hour.

Backbone Copolymer A was dissolved in chlorobenzene to form a solution, and the resulting solution was purged with $N_2$ for about 1 hour. nBA (Aldrich, 99%) was passed through an alumina column to remove the deactivator, and the resulting monomer solution was purged with $N_2$ for about 1 hour. $CuCl_2$ (Aldrich, 99.99%) (5.3 mg, 39.5 µmol) was dissolved in 0.2 mL dimethyl sulfoxide (DMSO). Chlorobenzene (0.8 mL) was then added to the DMSO, and the resulting mixture was purged with $N_2$ for 10 minutes.

About 0.10 mL of the above DMSO mixture, 2 mL of the nBA monomer solution (13.8 mmol nBA), and 8.0 mL of the Backbone Copolymer A/chlorobenzene solution (246.6 mg Backbone Copolymer A) were injected into the reaction flask. The reaction flask was placed in a thermostated oil bath at 90° C. The reaction solution became brown. $Sn(EH)_2$ (31.20 mg, 77.0 µmol) was dissolved in 1 mL chlorobenzene and bubbled with $N_2$ for 30 minutes. At 120 hours into the reaction, 0.1 mL $Sn(EH)_2$ solution was injected into the reaction flask to restart the polymerization. Small amounts of reaction solution were taken out via syringe at various time intervals. These samples were analyzed by $^1$H-NMR ($CDCl_3$ as the solvent) to determine the monomer conversion, and by triple detector GPC to measure molecular weight and molecular weight distribution ($M_w/M_n$) of the comb-block copolymer. After 222 hours, the reaction was stopped by exposing the catalyst to air. The reaction solution became green. The reaction solution was diluted with tetrahydrofuran (THF), and added dropwise into methanol, yielding a transparent sticky solid.

The progression of the ATRP of nBA from Backbone Copolymer A as a function of time is illustrated in Table 1.

TABLE 1

| Reaction Time (h) | Conversion (%) | $M_n$ (g/mol) | $M_w$ (g/mol) | $M_w/M_n$ | Intrinsic Viscosity (dL/g) | Hydrodynamic Volume (nm) |
|---|---|---|---|---|---|---|
| 0 | 0 | 199,638 | 388,733 | 1.95 | 1.114 | 18.20 |
| 137 | 14.0 | 777,819 | 1,115,000 | 1.43 | 0.858 | 23.90 |
| 160 | 16.3 | 987,075 | 1,395,000 | 1.41 | 0.817 | 25.20 |
| 200 | 19.3 | 966,425 | 1,438,000 | 1.49 | 0.813 | 25.40 |

As seen above in Table 1, the molecular weight distribution of the comb-block copolymer at the end of the reaction was markedly lower (1.49) than that of the initial molecular weight distribution of Backbone Copolymer A (1.95). A decrease in molecular weight distribution was observed throughout the reaction, with the exception of a slight increase in PDI between 160 and 200 hours, which was likely a result of experimental variation or error. This overall trend of decreasing molecular weight distribution as the polymerization progressed reflects the semi-living nature of ATRP.

As also seen from Table 1, the weight average molecular weight of the comb-block copolymer at the end of the reaction was 1,049,267 g/mol greater than that of Backbone Copolymer A. Assuming that the comb-block copolymer comprised somewhere in the range of the preferred minimum number of 10 comb arms up to around 22 comb arms (the maximum number of comb arms using Backbone Copolymer A), this increase in molecular weight indicates that, on average, each comb arm had a weight average molecular weight ranging from approximately 50,000 g/mol to 100,000 g/mol.

Example 2

ATRP of t-Butyl Acrylate (tBA) from Backbone Copolymer A:

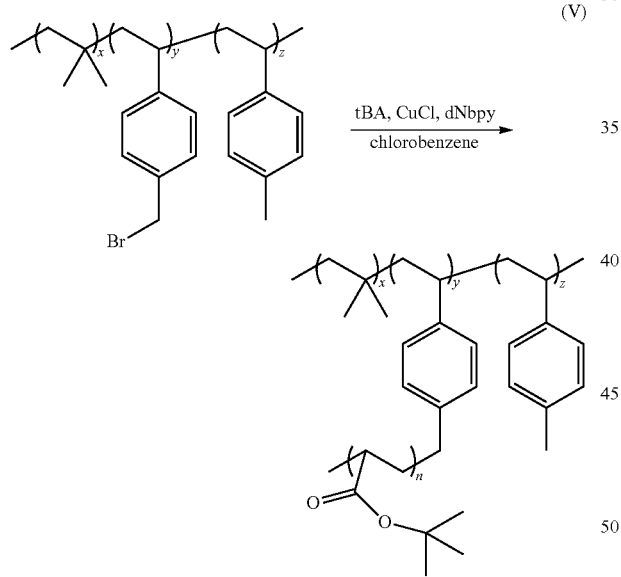

(V)

wherein x, y, z, and n each represent a polymeric unit that is repeated within the comb-block copolymer.

CuCl (Aldrich, 99.99%) (31.3 mg, 315.7 μmol) and dNbpy (Aldrich, 97%) (269.3 mg, 639.2 μmol) were added in a 100 mL round bottom reaction flask with side arm. The reaction flask was then sealed with a glass stopper and purged with N$_2$ for about 1 hour.

Backbone Copolymer A was dissolved in chlorobenzene to form a solution, and the resulting solution was purged with N$_2$ for about 1 hour. tBA (Aldrich, 99%) was passed through an alumina column to remove the deactivator, and the resulting monomer solution was purged with N$_2$ for about 1 hour. CuCl$_2$ (Aldrich, 99.99%) (21.2 mg, 157.8 μmol) was dissolved in 0.8 mL DMSO. Chlorobenzene (0.8 mL) was then added to the DMSO, and the resulting mixture was purged with N$_2$ for 10 minutes.

About 0.10 mL of the above DMSO mixture, 8 mL of the tBA monomer solution (55.24 mmol tBA), and 32.0 mL of the Backbone Copolymer A/chlorobenzene solution (986.5 mg Backbone Copolymer A) were injected into the reaction flask. The reaction flask was placed in a thermostated oil bath at 90° C. The reaction solution became brown. After 24 hours, 0.1 mL (Sn(EH)$_2$) solution (319.75 mg in 1 mL chlorobenzene, bubbled with N$_2$ for 30 min) was injected into the reaction flask to restart the polymerization. After 46 hours, the reaction was stopped by exposing the catalyst to air. The reaction solution became green. The reaction solution was diluted with THF, and added dropwise into methanol, yielding a rubber-like solid. A small amount of reaction solution was analyzed by $^1$H-NMR (CDCl$_3$ as the solvent) to determine the reaction conversion. Monomer conversion at 46 hours=18.3%.

Example 3

ATRP of Styrene from Backbone Copolymer B:

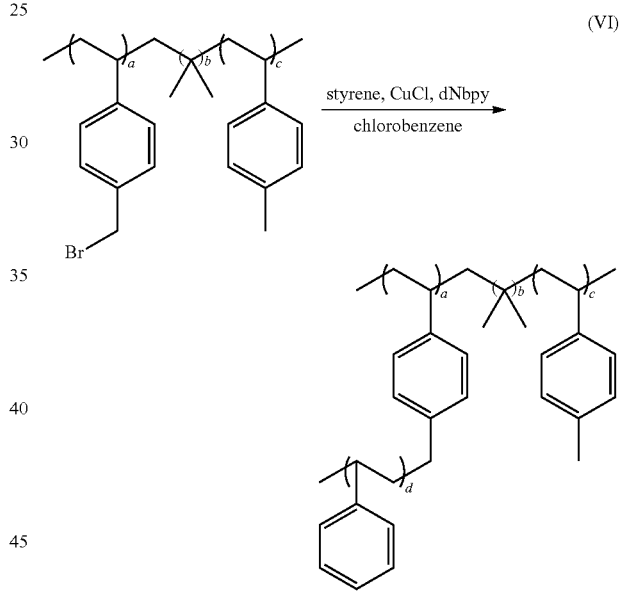

(VI)

wherein a, b, c, and d each represent a polymeric unit that is repeated within the comb-block copolymer.

Backbone Copolymer B (5 g) was dissolved into 100 g of toluene in a 500 mL round-bottom reaction flask on a hot-plate kept at 100° C. Styrene monomer was purified by being passed through an alumina column to remove inhibitors.

The purified styrene monomer (9.3 g), CuBr$_2$ (Acros, 99%) (0.1 g), dNbpy (Aldrich, 97%) (0.4 g, 900 μmol) and chlorobenzene (0.1 g) were then added to the reaction flask. The flask was sealed with a rubber septum and purged with N$_2$ for 30 minutes while being kept at 100° C. Sn(EH)$_2$ (180 mg, 440 μmol) was then added to start the reaction. After 4 hours, the solution became very thick and gel like. After 18 hours, the reaction was stopped by exposing the catalyst to air, yielding a rubber-like gel reaction product. A small amount of reaction product was analyzed by $^1$H-NMR (CDCl$_3$ as the solvent) to determine the reaction conversion. Monomer conversion at 18 hours≈100%.

Example 4

ATRP of Styrene from Backbone Copolymer A

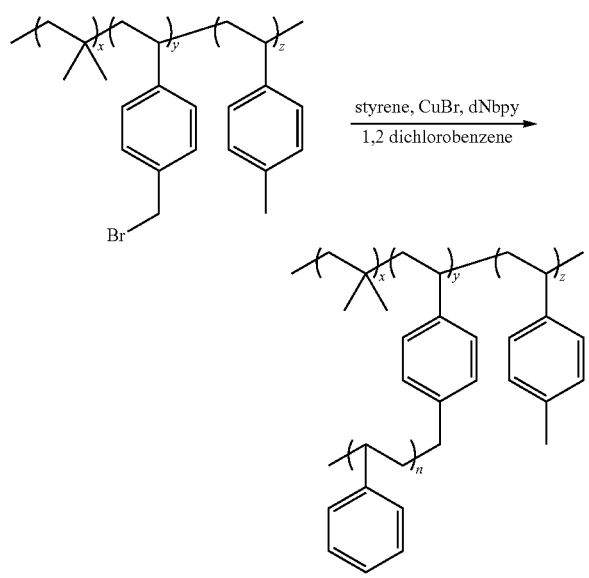

Backbone Copolymer A (1 g) was dissolved into 33.3 g of dichlorobenzene (DCB) and degassed by sparging with $N_2$. A solution of $CuBr_2$ (Arcos, 99%) (0.01 M) and dNbpy (Aldrich, 97%) (0.01 M) in dimethylformamide (DMF) was prepared (hereinafter, "catalyst solution") and degassed by sparging with $N_2$. A solution of $Sn(EH)_2$ (10 μM) was prepared in 1,2-dichlorobenzene and degassed by sparging with $N_2$. Styrene monomer was purified by being passed through an alumina column to remove inhibitors, and the resulting purified monomer was degassed by sparging with $N_2$.

Inside a glove box, a 50 mL crimp top bottle with stir bar was charged with Backbone Copolymer A/dichlorobenzene solution (3.5 g), followed by catalyst solution (0.05 mL), styrene (2.1 g), and $Sn(EH)_2$ solution (0.05 mL). The bottle was sealed with a septum and heated to 90° C. on a hotplate, and allowed to stir for 4 days at which time the reaction mixture was cooled, exposed to air, diluted with toluene, and precipitated in methanol, yielding a white solid. A small amount of reaction product was analyzed by $^1$H-NMR ($CDCl_3$ as the solvent) to determine the reaction conversion and by differential refractive index (DRI) to measure molecular weight.

As illustrated in FIG. 1, the NMR spectra of the produced comb-block copolymer exhibited two peaks at a chemical shift (δ) between approximately 6.3 and 7.2 parts per million (ppm). These peaks correspond to the aromatic groups present in the polystyrene comb arms of the comb-block copolymer. The NMR spectra also exhibited two peaks at a δ between approximately 1.3 and 2.3 ppm, corresponding to the backbone chain of the polystyrene comb arms of the comb-block copolymer. Lastly, the NMR spectra exhibited a peak at a δ of approximately 1.1 ppm, corresponding to the polyisobutylene methyl groups present in the halogenated copolymer backbone (Backbone Copolymer A) of the comb-block copolymer.

The final comb-block copolymer had a number average molecular weight (Mn) of 168,958 g/mol, a weight average molecular weight (Mw) of 885,772 g/mol, and a molecular weight distribution of 5.24. In comparison, the starting material backbone copolymer (Copolymer A) had a number average molecular weight (Mn) of 236,029 g/mol, a weight average molecular weight (Mw) of 602,838 g/mol, and a molecular weight distribution of 2.55. As expected, the average molecular weight of the comb-block copolymer was greater than that of the backbone copolymer. However, the molecular weight distribution of the comb-block copolymer was higher than that of the backbone copolymer, while a decrease in molecular weight distribution was expected. The DRI analysis indicated that the comb-block copolymer exhibited a bimodal molecular weight distribution. Based on this bimodal nature of the molecular weight distribution, the increase in molecular weight distribution was likely due either to incomplete initiation of the benzylic halide moiety or to differing rates of monomer incorporation at the end of the polymerization due to high solution viscosity.

Additional Test Methods

Molecular weights (number average molecular weight (Mn) and weight average molecular weight (Mw)) are determined using a Polymer Laboratories Model 220 high temperature GPC-SEC equipped with on-line differential refractive index (DRI), light scattering (LS), and viscometer (VIS) detectors (so called GPC-3D, Gel Permeation Chromatography-3 Detectors). It uses three Polymer Laboratories PLgel 10 m Mixed-B columns for separation using a flow rate of 0.54 ml/min and a nominal injection volume of 300 μL. The detectors and columns are contained in an oven maintained at 135° C. The stream emerging from the size exclusion chromatography (SEC) columns is directed into the miniDAWN (Wyatt Technology, Inc.) optical flow cell and then into the DRI detector. The DRI detector is an integral part of the Polymer Laboratories SEC. The viscometer is inside the SEC oven, positioned after the DRI detector. The details of these detectors, as well as their calibrations referenced to polystyrene, have been described by, for example, T. Sun, P. Brant, R. R. Chance, and W. W. Graessley, in 34(19) MACROMOLECULES, 6812-6820, (2001).

Having described and demonstrated the various aspects of the inventive polycyclic aromatic hydrocarbon functionalized isobutylene copolymers for dispersing graphene and graphite, described here in numbered paragraphs is:

P1. A comb-block copolymer comprising (i) a polymeric backbone having a number average molecular weight ranging from 100,000 to 350,000 g/mol, wherein the polymeric backbone comprises at least one halogenated copolymer comprising units derived from isoolefins having from 4 to 7 carbons and a para-alkylstyrene, and (ii) one or more polymeric comb arms comprising at least one functional polymer, wherein the functional polymer comprises at least one aromatic moiety and/or at least one heteroatom containing moiety, preferably wherein the functional polymer comprises units derived from at least one of acrylates, acrylamides, and acrylonitrile.

P2. The comb-block copolymer of previous numbered paragraph 1, wherein the functional polymer further comprises units derived from styrenes.

P3. The comb-block copolymer of any one of the previous numbered paragraphs, wherein the polymeric backbone has a weight average molecular weight ranging from 300,000 to 750,000 g/mol, and wherein each of the one or more polymeric comb arms has a weight average molecular weight ranging from 2,000 to 400,000 g/mol.

P4. The comb-block copolymer of any one of the previous numbered paragraphs, wherein the comb-block copolymer has a molecular weight distribution (Mw/Mn) ranging from 1.2 to 3.0.

P5. The comb-block copolymer of any one of the previous numbered paragraphs, wherein the comb-block copolymer has from 10 to 550 polymeric comb arms.

P6. The comb-block copolymer of any one of the previous numbered paragraphs, wherein the halogenated copolymer is brominated poly(isobutylene-co-p-methylstyrene) (BIMSM).

P7. A latex coating material and/or additive comprising the comb-block copolymer of any one of the previous numbered paragraphs, wherein the functional polymer comprises units derived from an acrylate.

P8. A silica dispersant tire tread additive comprising the comb-block copolymer of any one of the previous numbered paragraphs, wherein the functional polymer comprises units derived from an acrylate.

P9. The comb-block copolymer of any one of the previous numbered paragraphs, wherein the functional polymer comprises units derived from n-butyl acrylate (nBA).

P10. A sealant comprising the comb-block copolymer of previous numbered paragraph 9.

P11. The comb-block copolymer of any one of the previous numbered paragraphs, wherein the functional polymer comprises units derived from t-butyl acrylate (tBA).

P12. An acrylic acid graft copolymer obtained from the comb-block copolymer of previous numbered paragraph 11.

P13. A surfactant comprising the comb-block copolymer of any one of the previous numbered paragraphs, wherein the functional polymer comprises units derived from a methacrylamide.

P14. An article comprising the comb-block copolymer of any one of the previous numbered paragraphs, wherein the functional polymer comprises units derived from acrylonitrile, and wherein the article is an oil resistant sealant.

P15. A tire tread additive comprising the comb-block copolymer of any one of the previous numbered paragraphs 2 to 6, wherein the functional polymer comprises units derived from a styrene, and wherein the additive is compatible with styrene-butadiene rubber (SBR).

P16. An elastomeric nanocomposite composition comprising: (a) a comb-block copolymer comprising (i) a polymeric backbone comprising at least one halogenated copolymer comprising units derived from isoolefins having from 4 to 7 carbons and a para-alkylstyrene and (ii) one or more polymeric comb arms comprising at least one functional polymer, wherein the functional polymer comprises units derived from a vinyl terminated $C_6$ to $C_{20}$ aromatic; (b) at least one halogenated elastomer component comprising units derived from isoolefins having from 4 to 7 carbons; and (c) at least one nanofiller, wherein the nanofiller is selected from the group consisting of graphene, chemically converted graphene, graphite, expanded graphite, carbon black, and mixtures thereof.

P17. The nanocomposite composition of previous numbered paragraph 16, wherein the halogenated elastomer component is selected from the group consisting of chlorinated poly(isobutylene-co-isoprene) (CIIR), brominated poly (isobutylene-co-isoprene) (BIIR), and mixtures thereof.

P18. A tire innerliner comprising the nanocomposite composition of any one of the previous numbered paragraphs 16 to 17.

P19. A method for producing a comb-block copolymer, the method comprising polymerizing one or more monomer components comprising units derived from at least one of acrylates, acrylamides, and acrylonitrile using a halogenated copolymer initiator having a benzylic-halide moiety via atom transfer radical polymerization (ATRP), wherein the halogenated copolymer initiator comprises units derived from isoolefins having from 4 to 7 carbons and a para-alkylstyrene, and wherein the polymerization is performed in the presence of a transition metal complex catalyst at a temperature ranging from 30° C. to 150° C.

P20. The method of previous numbered paragraph 19, wherein the transition metal is selected from the group consisting of Cu, Ti, Mo, Re, Fe, Ru, Os, Rh, Co, Ni, Pd, and mixtures thereof.

P21. The method of previous numbered paragraph 20, wherein the transition metal is Cu, and wherein the transition metal complex further comprises a dinonyl-2,2'-dipyridyl (dNbpy) ligand.

P22. The method of previous numbered paragraph 21, wherein the copper is reduced from Cu(II) to Cu(I) using tin (II) 2-ethylhexanoate.

P23. The method of any one of previous numbered paragraphs 19 to 22, wherein the halogenated copolymer initiator is brominated poly(isobutylene-co-p-methylstyrene) (BIMSM).

P24. The method of any one of previous numbered paragraphs 19 to 23, further comprising blending the comb-block copolymer with at least one halogenated elastomer component comprising units derived from isoolefins having from 4 to 7 carbons, and at least one nanofiller to obtain an elastomeric nanocomposite composition, wherein the monomer component further comprises units derived from a vinyl terminated $C_6$ to $C_{20}$ aromatic.

P25. The method of previous numbered paragraph 24, wherein the nanofiller is selected from the group consisting of graphene, chemically converted graphene, graphite, expanded graphite, carbon black, and mixtures thereof.

Also disclosed herein is the use of the comb-block copolymer described herein in a tire innerliner. Also disclosed herein is the use of the comb-block copolymer described herein in a sealant. Also disclosed herein is the use of the comb-block copolymer described herein in a latex coating material and/or additive. Also disclosed herein is the use of the comb-block copolymer described herein in a silica dispersant tire tread additive. Also disclosed herein is the use of the comb-block copolymer described herein in a surfactant. Also disclosed herein is the use of the comb-block copolymer described herein as a nanofiller dispersant in an elastomeric nanocomposite composition.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated. The term "comprising" is synonymous with the term "including." Likewise, whenever a composition, an element or a group of components is preceded with the transitional phrase "comprising," it is understood that we also contemplate the same composition or group of components with transitional phrases "consisting essentially of," "consisting of," "selected from the group of consisting of," or "is" preceding the recitation of the composition, component, or components, and vice versa.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A comb-block copolymer comprising:
   (a) a polymeric backbone having a number average molecular weight ranging from 100,000 to 350,000 g/mol, wherein the polymeric backbone comprises at least one halogenated copolymer comprising units derived from isoolefins having from 4 to 7 carbons and a para-alkylstyrene; and
   (b) one or more polymeric comb arms comprising at least one functional polymer, wherein the functional polymer comprises units derived from at least one of acrylates, acrylamides, and acrylonitrile;
   wherein the comb-block copolymer has a molecular weight distribution (Mw/Mn) ranging from 1.2 to 3.0.

2. The comb-block copolymer of claim 1, wherein the polymeric backbone has a weight average molecular weight ranging from 300,000 to 750,000 g/mol, and wherein each of the one or more polymeric comb arms has a weight average molecular weight ranging from 2,000 to 400,000 g/mol.

3. The comb-block copolymer of claim 1, wherein the comb-block copolymer has from 10 to 550 polymeric comb arms.

4. The comb-block copolymer of claim 1, wherein the halogenated copolymer is brominated poly(isobutylene-co-p-methylstyrene) (BIMSM).

5. A latex coating material and/or additive comprising the comb-block copolymer of claim 1, wherein the functional polymer comprises units derived from an acrylate.

6. A silica dispersant tire tread additive comprising the comb-block copolymer of claim 1, wherein the functional polymer comprises units derived from an acrylate.

7. The comb-block copolymer of claim 1, wherein the functional polymer comprises units derived from n-butyl acrylate (nBA).

8. A sealant comprising the comb-block copolymer of claim 7.

9. The comb-block copolymer of claim 1, wherein the functional polymer comprises units derived from t-butyl acrylate (tBA).

10. An acrylic acid graft copolymer obtained from the comb-block copolymer of claim 9.

11. A surfactant comprising the comb-block copolymer of claim 1, wherein the functional polymer comprises units derived from a methacrylamide.

12. An article comprising the comb-block copolymer of claim 1, wherein the functional polymer comprises units derived from acrylonitrile, and wherein the article is an oil resistant sealant.

13. The comb-block copolymer of claim 1, wherein the functional polymer further comprises units derived from styrenes.

14. A tire tread additive comprising the comb-block copolymer of claim 13, wherein the functional polymer comprises units derived from a styrene, and wherein the additive is compatible with styrene-butadiene rubber (SBR).

15. An elastomeric nanocomposite composition comprising
   (a) a comb-block copolymer comprising (i) a polymeric backbone comprising at least one halogenated copolymer comprising units derived from isoolefins having from 4 to 7 carbons and a para-alkylstyrene and (ii) one or more polymeric comb arms comprising at least one functional polymer, wherein the functional polymer comprises units derived from a vinyl terminated $C_6$ to $C_{20}$ aromatic;
   (b) at least one halogenated elastomer component comprising units derived from isoolefins having from 4 to 7 carbons; and
   (c) at least one nanofiller, wherein the nanofiller is selected from the group consisting of graphene, chemically converted graphene, graphite, expanded graphite, carbon black, and mixtures thereof.

16. The nanocomposite composition of claim 15, wherein the halogenated elastomer component is selected from the group consisting of chlorinated poly(isobutylene-coisoprene) (CIIR), brominated poly(isobutylene-co-isoprene) (BIIR), and mixtures thereof.

17. A tire innerliner comprising the nanocomposite composition of claim 15.

18. A method for producing a comb-block copolymer, the method comprising:
   polymerizing one or more monomer components comprising units derived from at least one of acrylates, acrylamides, and acrylonitrile using a halogenated copolymer initiator having a benzylic-halide moiety via atom transfer radical polymerization (ATRP),
   wherein the halogenated copolymer initiator comprises units derived from isoolefins having from 4 to 7 carbons and a para-alkylstyrene; and
   wherein the polymerization is performed in the presence of a transition metal complex catalyst at a temperature ranging from 30° C. to 150° C.

19. The method of claim 18, wherein the transition metal is selected from the group consisting of Cu, Ti, Mo, Re, Fe, Ru, Os, Rh, Co, Ni, Pd, and mixtures thereof.

20. The method of claim 19, wherein the transition metal is Cu, and wherein the transition metal complex further comprises a dinonyl-2,2'-dipyridyl (dNbpy) ligand.

21. The method of claim 20, wherein the copper is reduced from Cu(II) to Cu(I) using tin (II) 2-ethylhexanoate.

22. The method of claim 18, wherein the halogenated copolymer initiator is brominated poly(isobutylene-co-p-methylstyrene) (BIMSM).

23. The method of claim 18, further comprising blending the comb-block copolymer with
   (i) at least one halogenated elastomer component comprising units derived from isoolefins having from 4 to 7 carbons; and
   (ii) at least one nanofiller to obtain an elastomeric nanocomposite composition, wherein the monomer component further comprises units derived from a vinyl terminated $C_6$ to $C_{20}$ aromatic.

24. The method of claim 23, wherein the nanofiller is selected from the group consisting of graphene, chemically converted graphene, graphite, expanded graphite, carbon black, and mixtures thereof.

* * * * *